United States Patent [19]

McCarter

[11] 4,090,071
[45] May 16, 1978

[54] PHOTOMETRIC INSTRUMENT WITH THERMOELECTRIC CONTROL OF A PHOTOVOLTAIC SEMICONDUCTOR DETECTOR

[75] Inventor: Craig A. McCarter, Old Greenwich, Conn.

[73] Assignee: Hoffman Engineering Corporation, Old Greenwich, Conn.

[21] Appl. No.: 694,648

[22] Filed: Jun. 10, 1976

[51] Int. Cl.² .............................................. H01J 7/24
[52] U.S. Cl. ..................................... 250/238; 307/310
[58] Field of Search ................. 250/238, 239; 307/310

[56] References Cited

U.S. PATENT DOCUMENTS

| 3,444,399 | 5/1969 | Jones | 307/310 |
|---|---|---|---|
| 3,703,651 | 11/1972 | Blowers | 307/310 |
| 3,877,817 | 4/1975 | Ralston | 250/238 X |
| 3,962,559 | 6/1976 | Drda | 307/310 X |

Primary Examiner—Rudolph V. Rolinec
Assistant Examiner—Vincent J. Sunderdick

[57] ABSTRACT

A highly accurate thermoelectrically controlled radiant energy detector achieving sufficient measurement stability to permit it to monitor the radiant energy output of a calibrated standard instrument, such as a luminance/illuminance source, which is to generate a standard quantity of radiant energy to be used, e.g., in the field testing and calibration of photometric instruments. The radiant energy detector provides a highly stable and drift free photometric measurement using a silicon photovoltaic detector arranged to receive radiant energy upon a sensitive surface thereof and to emit an electrical output signal related to the magnitude of incident radiant energy. A thermally conductive member, such as a mounting block, carries the light detecting element, and temperature sensing means, such as the semiconductor junction of a transistor, is in thermal communication with the conductive member. Controllable heat emitting means, such as another transistor, also is in thermal communication with the conductive member and a feedback circuit responds to the temperature sensing means for controlling the heat emitting means to maintain the conductive member and the light detecting element carried thereby at a constant temperature elevated above ambient temperature, e.g., 40° C. The relationship between incident radiant energy and electrical output of the light detecting element remains substantially invariant, e.g., with a drift of approximately only 1% per year. Spectral response is stabilized and sensitivity is improved. Accordingly, the radiant energy detector and monitored radiant energy source allow highly accurate field or laboratory measurement and calibration to take place.

2 Claims, 5 Drawing Figures

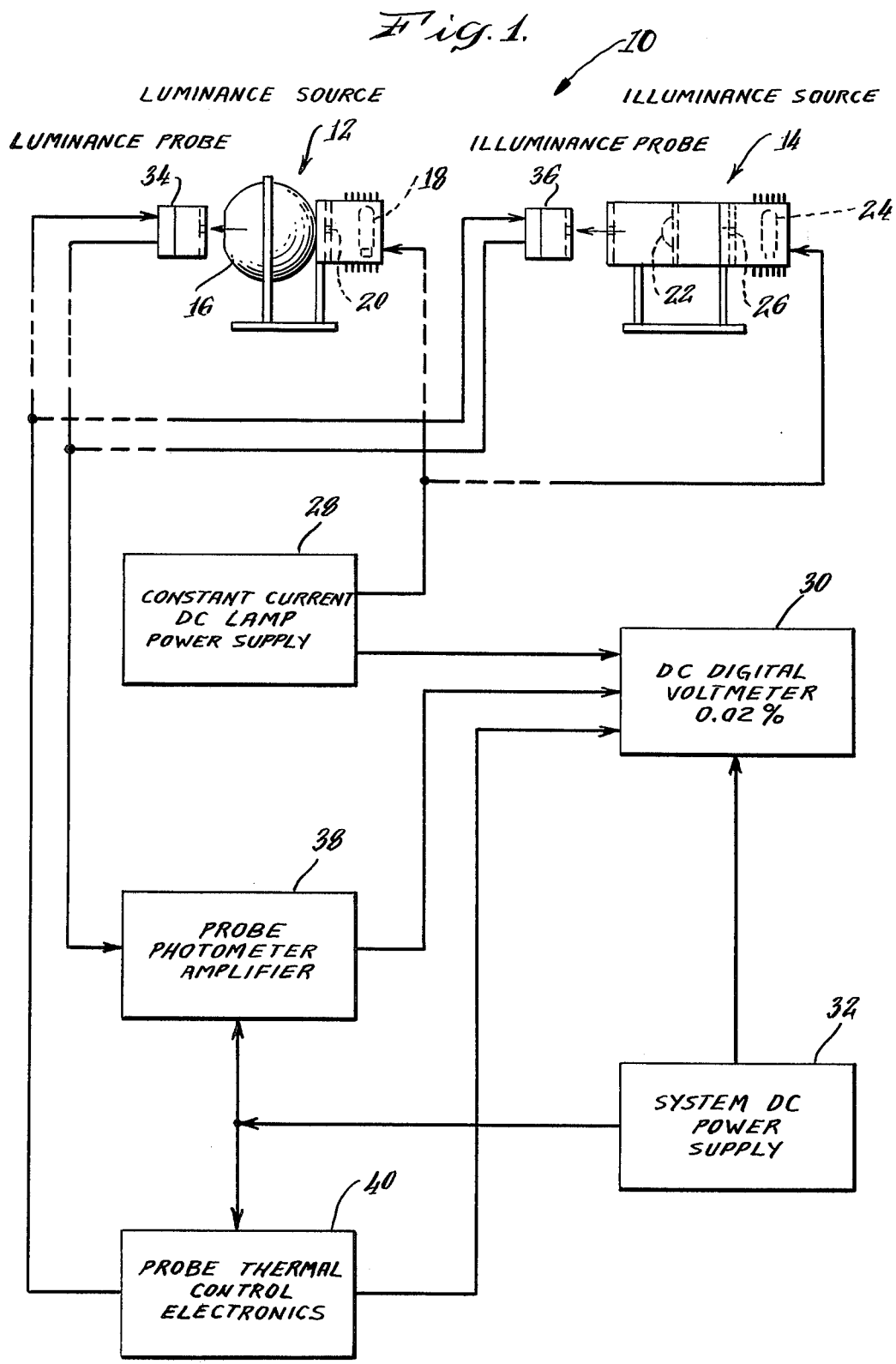

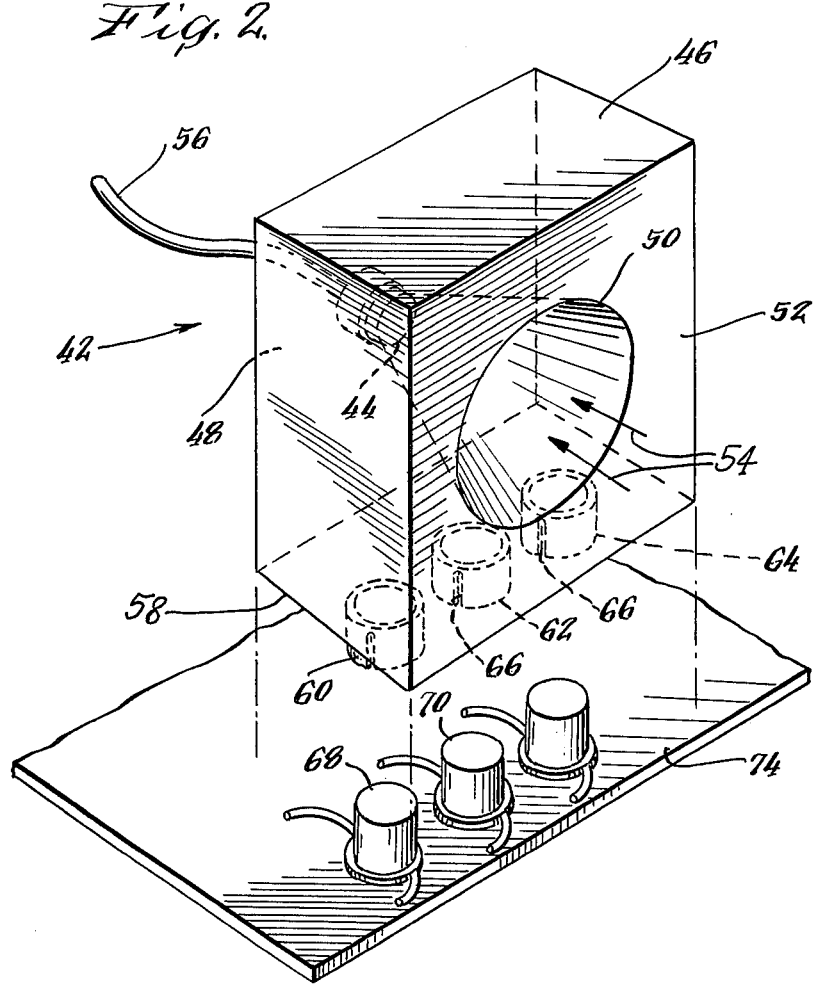
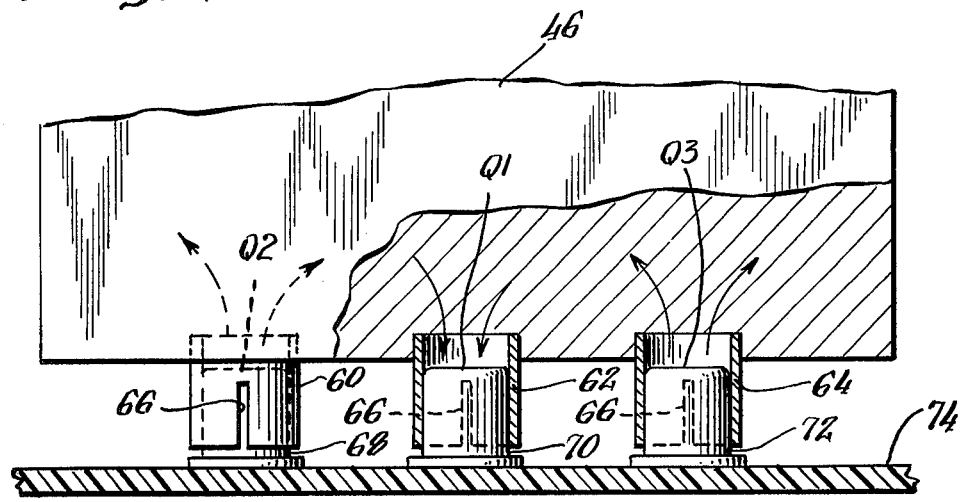

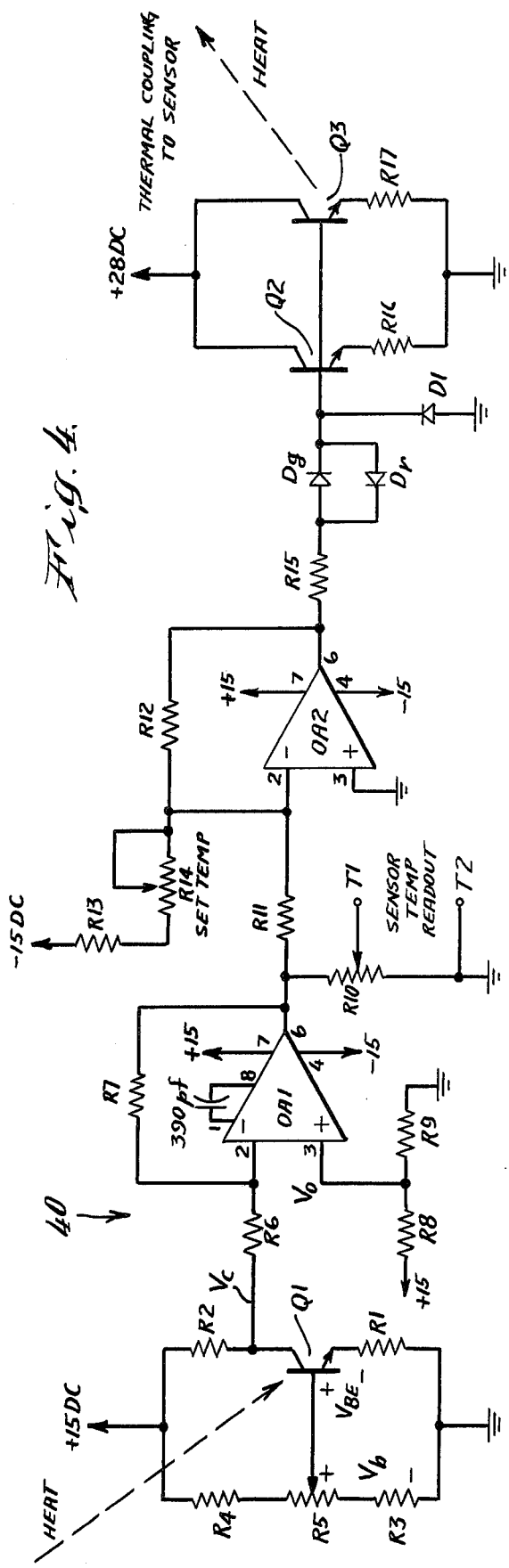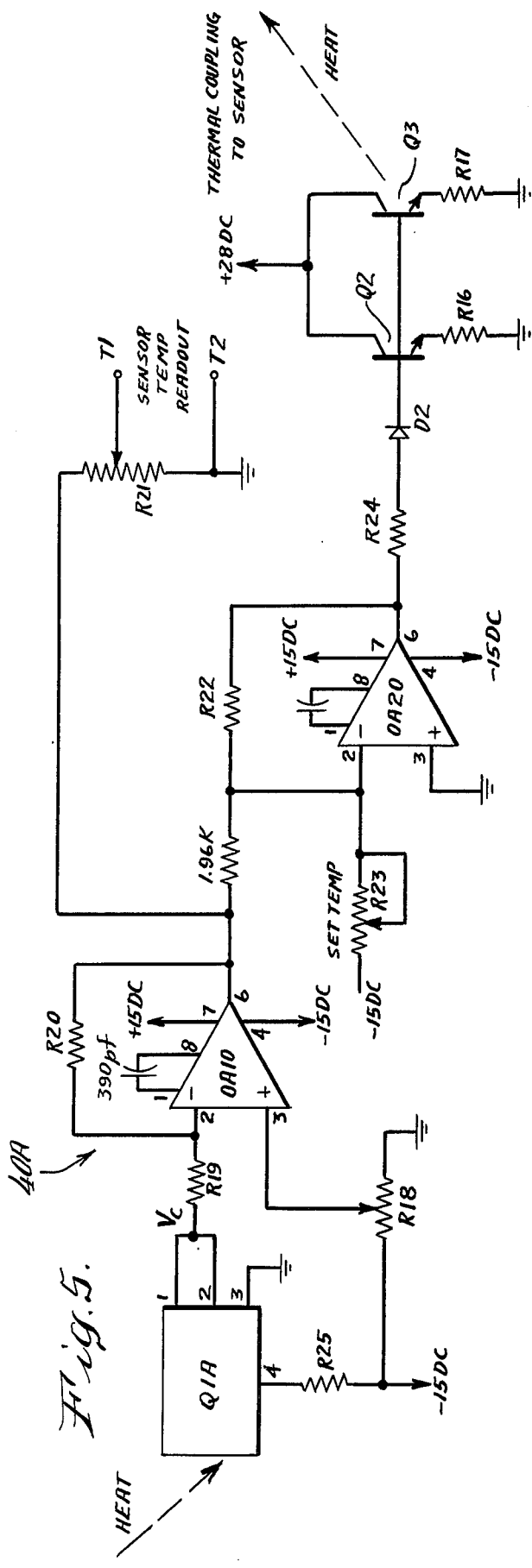

PHOTOMETRIC INSTRUMENT WITH THERMOELECTRIC CONTROL OF A PHOTOVOLTAIC SEMICONDUCTOR DETECTOR

BACKGROUND OF THE INVENTION

1. Field of the Invention

This invention relates to radiant energy detectors in the field of radiometry and photometry, and to standard instruments, such as luminance/illuminance sources, for generating stable calibrated quantities of radiant energy to be used, e.g., in calibrating photometric instruments.

2. Description of the Prior Art

In developing a luminance/illuminance source to be used for field calibration of photometers with a high degree of accuracy, e.g., within 3% of the photometric standards maintained by the National Bureau of Standards at a high level of user confidence, it is necessary to face the problem that in the field, calibration is highly dependent upon the stability of standard lamps and there is no way to guarantee the stability of a given lamp standard to within 3%. In order to achieve the required degree of reliability, it is necessary either to use redundant calibration with a statistically large sample of lamps, or to check the output of the calibration source each time it is used with a photometric instrument whose accuracy is itself better than 3%.

Present photometric instruments using silicon photovoltaic detectors are able to extend the range of linearity between incident radiant energy and output current over that available with previous selenium detectors. However, the requirement of a photometric instrument to stably measure luminance/illuminance within 3% relative to NBS standards is not being met by current instruments. Those devices which are stable over time are not generally stable over temperature and those which claim electrical temperature compensation are not spectrally stable over temperature. Present state of the art instruments generally are accurate to only within 5% relative to NBS standards at 25° C.

As a result, present photometric instruments do not provide satisfactory accuracy and stability, and therefore cannot satisfactorily serve to maintain the output accuracy of a luminance/illuminance source to be used for calibration of photometers.

SUMMARY OF THE INVENTION

The principal object of the present invention is to provide an improved photometric instrument. Further objects of the invention are to provide a photometric instrument which has improved accuracy and stability, which obtains such improved accuracy and stability without a proportional increase in cost, and which achieves sufficient accuracy to permit it to monitor a standard source of radiant energy so it can be used as a calibrated source with high standards of accuracy. Still another object of the invention is to provide both a photometric instrument and a standard radiant energy source, such as a luminance/illuminance source, which are more suitable for commercial use.

In a preferred embodiment of the present invention to be described hereinbelow in detail, a photometric instrument includes a photovoltaic semiconductor light detecting element arranged to receive radiant energy upon a sensitive surface thereof and to emit an electrical output signal related to the magnitude of incident radiant energy. The photometric instrument is characterized by a thermally conductive member carrying the light detecting element, and temperature sensing means in thermal communication with the conductive member. Controllable heat emitting means also are in thermal communication with the conductive member, and a feedback circuit responding to the temperature sensing means controls the heat emitting means to maintain the conductive member, and the light detecting element, at a constant temperature elevated above customary ambient temperatures, e.g., at 40° C. The conductive member causes a thermal lag and evens out any fluctuation in detector temperature.

Pursuant to the present invention, it has been discovered that the foregoing structure causes the relationship between incident radiant energy and electrical output of the light detecting element to become substantially stabilized. It has been discovered that long term, permanent drifts dependent on the manufacturing techniques of a particular detector may be minimized by maintaining the detector at a constant temperature. Currently available hermetically sealed silicon detectors have exhibited drifts of less than 1% per year when held at constant temperature in accordance with the present invention. Three additional improvements have been discovered to be realizable in a photometric instrument constructed according to the present invention: First, degraded performance of the detector as a result of cycling it with respect to temperature does not occur. A second benefit of holding the detector at constant temperature is the stabilizing of the detector's relative spectral response. Silicon detectors typically exhibit considerable variation in sensitivity at shorter wave lengths over temperature and the resultant deviation in spectral response cannot be compensated electrically. Third, holding the detector at an elevated temperature improves its sensitivity. Accordingly, the present invention eliminates several sources of detector error and achieves an unexpectedly large improvement in accuracy using relatively inexpensive thermoelectric control arrangements.

In another aspect, a standard instrument for generating a stable calibrated quantity of radiant energy to be used, for example, in the testing and calibration of photometric instruments, is constructed in accordance with the present invention with a standard source of radiant energy of the type inherently subject to drift. A calibration probe accurately monitors the radiant energy output of the standard source to insure that it is held to its required level and includes a light detecting element arranged to receive radiant energy upon a sensitive surface thereof and to emit an electrical signal related to the incident radiant energy, and an electrical meter for indicating the magnitude of the electrical signal emitted by the light detecting element. A thermally conductive member is provided for mounting the light detecting element, and temperature sensing means are in thermal communication with the conductive member. Controllable heat emitting means also are in thermal communication with the conductive member, and a feedback circuit responds to the temperature sensing means to control the heat emitting means to maintain the member and the light detecting element at a constant temperature. The resultant stable relationship between the incident radiant energy from the standard source and the electrical signal output of the light detecting element allows the calibration probe to accurately indicate on the electrical meter the output of the standard source to check its calibrated value.

Other objects, aspects and advantages of the invention will be pointed out in, or apparent from, the detailed description hereinbelow, considered together with the following drawings.

DESCRIPTION OF THE DRAWINGS

FIG. 1 is an essentially schematic view of a standard luminance/illuminance source according to the invention;

FIG. 2 is a perspective view of a portion of a radiant energy detector used in the instrument of FIG. 1;

FIG. 3 is a sectional view, with enlarged scale and with portions deleted, of the detector assembly of FIG. 2;

FIG. 4 is a schematic diagram of a thermoelectric control circuit; and

FIG. 5 is a schematic diagram of another thermoelectric control circuit.

DESCRIPTION OF THE PREFERRED EMBODIMENT

FIG. 1 illustrates schematically a standard instrument 10 having a luminance source 12 and an illuminance source 14 which are to provide calibrated quantities of radiant energy to be used in the field calibration of photometers. The luminance source 12 comprises an integrating sphere 16, a standard lamp 18, and an adjustable aperture 20. The illuminance source comprises a collimating lens 22, a standard lamp 24, and an adjustable aperture 26. A lamp power supply 28 supplies constant DC current to lamps 18 and 24, and the magnitude of the lamp current is measured by a DC digital voltmeter 30 powered by a power supply 32.

In accordance with the present invention, the standard instrument 10 has a luminance probe 34 and an illuminance probe 36 which are provided for monitoring the outputs of sources 12 and 14 respectively to permit the sources to be maintained at their calibrated values, e.g., by adjusting apertures 20 and 26. The probes 34 and 36 have their electrical outputs fed through compensating amplifier 38 and indicated upon a digital voltmeter 30. In using instrument 10 for field calibration of a photometer, for example, the instrument operator would first couple probes 34 and 36 to sources 12 and 14 and take readings using digital voltmeter 30. If the standard lamps 18 and 24 have drifted, causing sources 12 and 14 to deviate from their calibrated values, the instrument operator adjusts apertures 20 and 26 until correct readings are obtained on voltmeter 30 to indicate that sources 12 and 14 are emitting the requisite amount of radiant energy. Photometer calibration then proceeds using the calibrated sources.

Pursuant to the present invention, the outputs of sources 12 and 14 are maintained accurately because calibrating probes 34 and 36 are constructed, as described below, so that their respective light detecting elements are held at a constant temperature by means of a thermoelectric control circuit 40 in instrument 10. As shown in FIG. 1, thermoelectric control circuit 40 has an output to voltmeter 30 to permit a temperature reading to be taken during initial standardization and to verify that the detector temperature remains constant during subsequent use.

FIG. 2 illustrates a portion of a radiant energy detector assembly 42 for use in probes 34 and 36 and arranged to maintain a light detecting element 44 at a constant temperature. The light detecting element 44 preferably is a silicon photovoltaic detector such as the detector manufactured by United Detector Technology of Santa Monica, California, model UDT-10, or the detector manufactured by EG & G Electroptics Division of Salem, Massachusetts, model PV-100. As shown in FIG. 2, the light detecting element 44 is mounted within a thermally conductive block 46 made for example of aluminum. As shown in FIG. 2, the light detecting element 44 is mounted through the back wall 48 of conductive block 46 in alignment with an aperture in the front wall 52 of block 46. Radiant energy, indicated by arrows 54, thus may pass through aperture 50 to a sensitive surface of light detecting element 44 to develop an electrical signal, related to the magnitude of incident radiant energy, upon an electrical lead 56 connected to amplifier circuit 38.

The bottom wall 58 of conductive block 46 is provided with three tubular sleeves or sockets 60, 62 and 64, also made for example of aluminum, having longitudinal slots 66 therein. The sockets closely receive cylindrical component housing 68, 70 and 72 mounted on a circuit board 74 which carries the thermoelectric control circuit 40. With component housings 68, 70 and 72 in sockets 60, 62 and 64, as shown in FIG. 3, each of the component housings is in thermal communication with the conductive mounting block 46 and with the light detecting element 44 therein. As will be described in greater detail below in connection with FIGS. 4 and 5, the center component housing 70 contains a temperature sensing semiconductor device Q1, and the component housings 68 and 72 on opposite sides thereof contain controllable heat emitting semiconductor devices Q2 and Q3. The devices Q1, Q2 and Q3 are controlled by thermoelectric control circuit 40 to maintain the conductive block 46, and the light detecting element 44 therein, at a constant temperature selected to be above the customary ambient temperatures in which the detector assembly 42 will be used. For ordinary usage, a temperature of about 40° C has been found suitable.

As shown in FIG. 2, the housings 68, 70 and 72 are located together, spaced from detector 44. Accordingly, the conductive block 46 provides a thermal lag between the temperature control elements Q1, Q2 and Q3 and detector 44 to smooth out any temperature fluctuations and thereby maintain the detector at a substantially invariant temperature.

FIG. 4 illustrates in schematic form a thermoelectric control circuit 40 in which temperature control devices Q1, Q2 and Q3 are transistors. Temperature sensing transistor Q1 has an emitter resistor R1 and a collector resistor R2 connecting the transistor between ground and a source of DC voltage. Resistors R3 and R4 and potentiometer R5 develop a bias voltage Vb, at the base of transistor Q1. Bias voltage Vb, as will be explained later, is set to provide an appropriate zero point for the sensor temperature readout signal at terminals T1 and T2. The collector voltage Vc of transistor Q1 varies inversely with the absolute temperature of transistor Q1, and is applied to the inverting input of an operational amplifier OA1 having an input resistor R6 and a feedback resistor R7. An offset voltage Vo, developed by a voltage divider formed with resistors R8 and R9, is applied to the amplifier noninverting input. Accordingly, the output of amplifier OA1 is a signal which increases with the absolute temperature of transistor Q1 and is offset in a positive direction in an amount determined by the offset voltage Vo and bias voltage Vb.

The output of amplifier OA1 is applied across a scaling potentiometer R10 which supplies a sensor temperature readout signal at terminals T1 and T2 to the digital voltmeter 30. The adjustable contact of potentiometer R10 is adjusted to provide the appropriate scale factor for the digital voltmeter, e.g., 10 millivolts per degree centigrade. The adjustable contact of potentiometer R5 is adjusted to provide the appropriate zero point, e.g., to provide a voltage of zero between terminals T1 and T2 when the temperature of transistor Q1 is zero degrees centigrade.

The output of operational amplifier OA1 also is applied through input resistor R11 to the inverting input terminal of a second operational amplifier OA2 having a feedback resistor R12. A second input to the inverting terminal of amplifier OA2 is provided by resistor R13 and potentiometer R14 connected to a source of negative DC voltage. Potentiometer R14 is adjusted to set the desired operating temperature of sensing transistor Q1 and conductive block 46. Since amplifier OA2 operates in an inverting mode, it will have a positive output voltage when the temperature of transistor Q1 is below the set temperature, and will have a negative output voltage when the sensed temperature is above the set temperature.

The output of operational amplifier OA2 is applied through a resistor R15 to two different circuits depending on its polarity. If the output voltage of amplifier OA2 is positive, current flows through a diode Dg into the bases of NPN transistors Q2 and Q3 to cause them to conduct through emitter resistors R16 and R17 and to emit heat into the thermally conductive block 46 until the temperature of transistor Q1 rises to the set point. If the output of amplifier OA2 is negative, current flows through diodes Dr and D1. Preferably diodes Dg and Dr are respectively green and red light emitting diodes providing a visual indication of any error in temperature, indicating green when the sensor is colder than the set point, and red when it is hotter than the set point. Since the dissipation in transistors Q2 and Q3 is proportional to the difference between the desired set point temperature and the sensor temperature, equilibrium is approached without overshoot and very accurate temperature control is maintained.

Accordingly, thermoelectric control circuit 40 keeps the light detecting element 44 thermally stable and, as has been discovered herein, electrically and spectrally stable as well, permitting highly accurate photometric instruments to be realized. It should be pointed out that whereas present state of the art devices are capable only of 5% accuracy relative to NBS standards, and the present invention is capable of 1% accuracy relative to NBS standards, the approximate fivefold improvement in accuracy is obtained relatively inexpensively, at the cost only of mounting block 46 and circuit 40.

FIG. 5 illustrates a modified thermoelectric control circuit 40A in which the temperature sensing semiconductor device Q1A is an integrated circuit sensor such as the sensor manufactured by National Semiconductor, model LX5600 or LM3911. The output voltage Vc of sensor Q1A is applied to an operational amplifier OA1a having an input resistor R19, a feedback resistor R20 and offset voltage input Vo developed from a potentiometer R18. The inverted and offset signal at the output of amplifier OA1a is applied to a scaling potentiometer R21 for application to terminals T1 and T2 connected to digital voltmeter 30 to provide a readout of sensor temperature. The output of amplifier OA1a is applied to the inverting input of operational amplifier OA2a with feedback resistor R22. A temperature set point signal is also applied to the inverting input of amplifier OA2a through a potentiometer R23. Thus, as in thermoelectric control circuit 40 of FIG. 4, the output of amplifier OA2a will be a positive voltage whenever the temperature of sensor Q1A is below the set point temperature and a negative voltage when the sensor temperature is above the set point temperature. A positive output voltage sends a current through resistor R24 and diode D2 to transistors Q2 and Q3 to cause them to dissipate heat into mounting block 46 to maintain the light detecting element 44 at the set point temperature.

Component types and values in circuits 40 and 40A were as follows in preferred embodiments of the circuits:

| | |
|---|---|
| Q1, Q2, Q3 | 2N2222A |
| OA1, OA1a, OA2a | LM308H |
| Dg, Dr | MV5491 |
| D1, D2 | IN 914 |
| R1 | 760 ohms |
| R2 | 4.99K |
| R3 | 976 |
| R4 | 3.3K |
| R5 | 1K |
| R6, R7 | 19.6K |
| R8 | 76.8K |
| R9 | 29.4K |
| R10 | 10K |
| R11 | 4.99K |
| R12 | 976K |
| R13 | 90.9K |
| R14 | 100K |
| R15 | 976 |
| R16, R17 | 56 |
| R18 | 50K |
| R19, R20 | 19.6 |
| R21 | 10K |
| R22 | 976K |
| R23 | 50K |
| R24, R25 | 4.99K |

From the foregoing description it can be seen that the present invention enables highly accurate photometric instruments to be realized without excessive cost, and that as a consequence, standard radiant energy sources with acceptable accuracy may be realized for use in field and laboratory calibration of photometers and in other applications where standard sources of radiant energy are needed.

Although specific embodiments of the invention have been disclosed herein in detail, it is to be understood that this is for the purpose of illustrating the invention and should not be construed as necessarily limiting the scope of the invention since it is apparent that many changes can be made to the disclosed structures by those skilled in the art to suit particular applications.

I claim:

1. A standard instrument for generating a stable calibrated quantity of radiant energy to be used such as in the testing and calibration of photometric instruments, the standard instruments being characterized by:
   a standard source of radiant energy;
   a calibration probe for accurately monitoring the radiant energy output of the standard source including:
      a photovoltaic silicon light detecting element arranged to receive radiant energy emitted from the standard source upon a sensitive surface thereof and to emit an electrical signal related to the incident radiant energy;
      a thermally conductive block member mounting the photovoltaic silicon light detecting element;
      temperature sensing means mounted on the thermally conductive block member and being in thermal communication with the silicon light detecting element along a continuous path through the conductive block member;

controllable heat emitting means mounted on the thermally conductive block member and being in thermal communication with the temperature sensing means and silicon light detecting element along continuous paths through the conductive block member;

a feedback circuit responsive to the temperature sensing means for controlling the heat emitting means to maintain the conductive block member and the silicon light detecting element at a constant temperature; and the silicon light detecting element being spaced from the temperature sensing and heat emitting means, located adjacent one another, to provide a thermal lag through the conductive block member to smooth out temperature fluctuations and thereby maintain the silicon light detecting element at a substantially invariant temperature; and an electrical meter for indicating the magnitude of the electrical signal emitted by the light detecting element and for thereby accurately indicating the output of the standard source of radiant energy; and means on the standard source of radiant energy for adjusting its output, whereby a standard radiant energy value, as measured by the calibration probe and electrical meter, may be obtained with great accuracy, whereby the relationship between incident radiant energy from the standard source and electrical signal output of the light detecting element remains substantially invariant and the calibration probe can accurately monitor the output of the standard source to maintain its calibrated value.

2. A standard instrument as claimed in claim 1 wherein the temperature sensing means and heat emitting means are semiconductor elements, the instrument further comprising a circuit board mounting the temperature sensing means and heat emitting means, and wherein the conductive block member detachably fits over the temperature sensing means and heat emitting means.

* * * * *